US011942687B2

(12) United States Patent
Henderson et al.

(10) Patent No.: US 11,942,687 B2
(45) Date of Patent: Mar. 26, 2024

(54) DEPLOYABLE REFLECTORS

(71) Applicant: Eagle Technology, LLC, Melbourne, FL (US)

(72) Inventors: Philip J. Henderson, Palm Bay, FL (US); Robert M. Taylor, Rockledge, FL (US)

(73) Assignee: Eagle Technology, LLC, Melbourne, FL (US)

( * ) Notice: Subject to any disclaimer, the term of this patent is extended or adjusted under 35 U.S.C. 154(b) by 1316 days.

(21) Appl. No.: 16/284,255

(22) Filed: Feb. 25, 2019

(65) Prior Publication Data

US 2020/0274248 A1 Aug. 27, 2020

(51) Int. Cl.
*H01Q 15/16* (2006.01)
*H01Q 1/28* (2006.01)

(52) U.S. Cl.
CPC ........... *H01Q 15/161* (2013.01); *H01Q 1/288* (2013.01)

(58) Field of Classification Search
CPC ..... H01Q 15/161; H01Q 1/1235; H01Q 1/288
See application file for complete search history.

(56) References Cited

U.S. PATENT DOCUMENTS 3,174,397 A 3/1965 Sanborn
3,179,211 A 4/1965 Dunlavy
3,495,250 A * 2/1970 Yee .......................... H01Q 9/27 343/834
3,509,576 A 4/1970 McLain
3,576,566 A 4/1971 Cover, Jr. et al.
3,617,113 A * 11/1971 Hoyer .................. H01Q 15/161 343/915
3,631,505 A * 12/1971 Carman ............... H01Q 15/161 343/915
3,635,547 A 1/1972 Rushing et al.
4,074,731 A * 2/1978 Archer ................... H01Q 1/288 140/112
4,380,013 A 4/1983 Slysh
4,475,323 A 10/1984 Schwartzberg et al.
(Continued)

FOREIGN PATENT DOCUMENTS

CN 107768797 A * 3/2018 ............... H01Q 1/08
WO WO-2013135298 A1 * 9/2013 ............. E04B 1/344

OTHER PUBLICATIONS

Chmielewski A B et al: "Arise Antenna", Aerospace Conference Proceedings, 2000 IEEE Mar. 18-25, 2000, Piscataway, NJ, USE, IEEE, vol. 7, Mar. 18, 2000 (Mar. 18, 2000), pp. 439-445.
(Continued)

*Primary Examiner* — Ab Salam Alkassim, Jr.
*Assistant Examiner* — Anh N Ho
(74) *Attorney, Agent, or Firm* — Fox Rothschild LLP; Carol E. Thorstad-Forsyth

(57) ABSTRACT

Systems and methods for operating an antenna with a tension cord network coupled to a plurality of anchor points of a perimeter hoop structure. The methods comprise: using the tension cord network to support a flexible antenna reflector surface such that a given shape of the flexible antenna reflector surface is provided; and allowing locations of the anchor points to change relative to the tension cord network while the antenna is in use. The flexible antenna reflector surface is held taut when the locations of the anchor points change relative to the tension cord network.

18 Claims, 11 Drawing Sheets

(56) References Cited

U.S. PATENT DOCUMENTS

| | | | | |
|---|---|---|---|---|
| 4,578,920 | A | 4/1986 | Bush et al. | |
| 5,016,418 | A | 5/1991 | Rhodes et al. | |
| 5,644,322 | A | 7/1997 | Hayes et al. | |
| 5,680,145 | A | 10/1997 | Thomson et al. | |
| 5,777,582 | A | 7/1998 | Raab et al. | |
| 5,787,671 | A | 8/1998 | Meguro et al. | |
| 5,990,851 | A | 11/1999 | Henderson et al. | |
| 6,028,570 | A | 2/2000 | Gilger et al. | |
| 6,150,995 | A | 11/2000 | Gilger | |
| 6,195,067 | B1 * | 2/2001 | Gilger | H01Q 15/168 343/915 |
| 6,225,965 | B1 | 5/2001 | Gilger et al. | |
| 6,243,053 | B1 | 6/2001 | Shtarkman | |
| 6,278,416 | B1 | 8/2001 | Harless | |
| 6,313,811 | B1 | 11/2001 | Harless | |
| 6,323,827 | B1 | 11/2001 | Gilger et al. | |
| 6,441,801 | B1 | 8/2002 | Knight et al. | |
| 6,542,132 | B2 | 4/2003 | Stern | |
| 6,618,025 | B2 | 9/2003 | Harless | |
| 7,686,255 | B2 | 3/2010 | Harris | |
| 8,066,227 | B2 | 11/2011 | Keller et al. | |
| 9,153,860 | B2 | 10/2015 | Tserodze et al. | |
| 9,484,636 | B2 | 11/2016 | Mobrem | |
| 9,496,621 | B2 | 11/2016 | Meschini et al. | |
| 9,660,351 | B2 * | 5/2017 | Medzmariashvili | H01Q 15/161 |
| 9,755,318 | B2 | 9/2017 | Mobrem et al. | |
| 9,815,574 | B2 | 11/2017 | Scolamiero et al. | |
| 2005/0104798 | A1 * | 5/2005 | Nolan | H01Q 1/08 343/915 |
| 2006/0181788 | A1 * | 8/2006 | Harada | G02B 7/183 359/841 |
| 2007/0200790 | A1 * | 8/2007 | Bassily | H01Q 15/168 343/915 |
| 2011/0187627 | A1 | 8/2011 | Palmer et al. | |
| 2017/0093046 | A1 * | 3/2017 | Harvey | H01Q 1/288 |
| 2017/0222308 | A1 * | 8/2017 | Freebury | H01Q 15/161 |
| 2017/0256840 | A1 | 9/2017 | Walker et al. | |
| 2018/0048059 | A1 | 2/2018 | Greschik | |

OTHER PUBLICATIONS

European Search Report issued in European Patent Application No. 20152719.9 dated Jul. 21, 2020.

* cited by examiner

400

DEPLOYABLE REFLECTORS

BACKGROUND

Statement of the Technical Field

The present disclosure relates generally to antenna systems. More particularly, the present disclosure relates to antenna systems with deployable reflectors.

Description of the Related Art

Satellites require RF energy concentrating antennas to provide high gain. These antennas comprise precision parabolic or similar shaped antenna reflectors that are carried into space using launch vehicles. During travel, each precision antenna is stowed in a constrained volume within a launch vehicle. Thus, the precision antenna is designed to be transitioned from a relatively compact stowed position to a fully extended position at the time of its deployment. In unfurlable mesh reflector applications, this transition typically relies on complex, precision assemblies of mechanical structures that must be highly repeatable when deployed.

SUMMARY

The present disclosure concerns implementing systems and methods for operating an antenna with a tension cord network coupled to a plurality of anchor points of a perimeter hoop structure. The methods comprise: using the tension cord network to support a flexible antenna reflector surface such that a given shape of the flexible antenna reflector surface is provided; and allowing locations of the anchor points to change relative to the tension cord network while the antenna is in use. Accordingly, a distance between at least one of the anchor points and a central axis of the flexible antenna reflector surface may change when the antenna is in use. The distance can be decreased or increased. The flexible antenna reflector surface is held taut when the locations of the anchor points change relative to the tension cord network.

In some scenarios, the tension cord network is coupled to the perimeter hoop structure by a plurality of resilient members (e.g., springs). The perimeter hoop structure comprises a ring, a plurality of stiff battens, or a plurality of spreader bars that each extend between two respective anchor points of the plurality of anchor points.

In other scenarios, the perimeter hoop structure comprises a plurality of resilient members that each extend between two respective anchor points of the plurality of anchor points. Each resilient member of the plurality of resilient members comprises a spring or a flexible batten.

The present document also concerns antennas. Each antenna comprises: a flexible antenna reflector surface; a tension cord network configured to support the flexible antenna reflector surface and maintain a shape of the flexible antenna reflector surface when in use; and a perimeter hoop structure comprising a plurality of anchor points to which the tension cord network is coupled. A location of each anchor point of the plurality of anchor points is variable relative to the tension cord network when the antenna is in a fully extended position.

BRIEF DESCRIPTION OF THE DRAWINGS

The present solution will be described with reference to the following drawing figures, in which like numerals represent like items throughout the figures.

DETAILED DESCRIPTION

Figure 1:
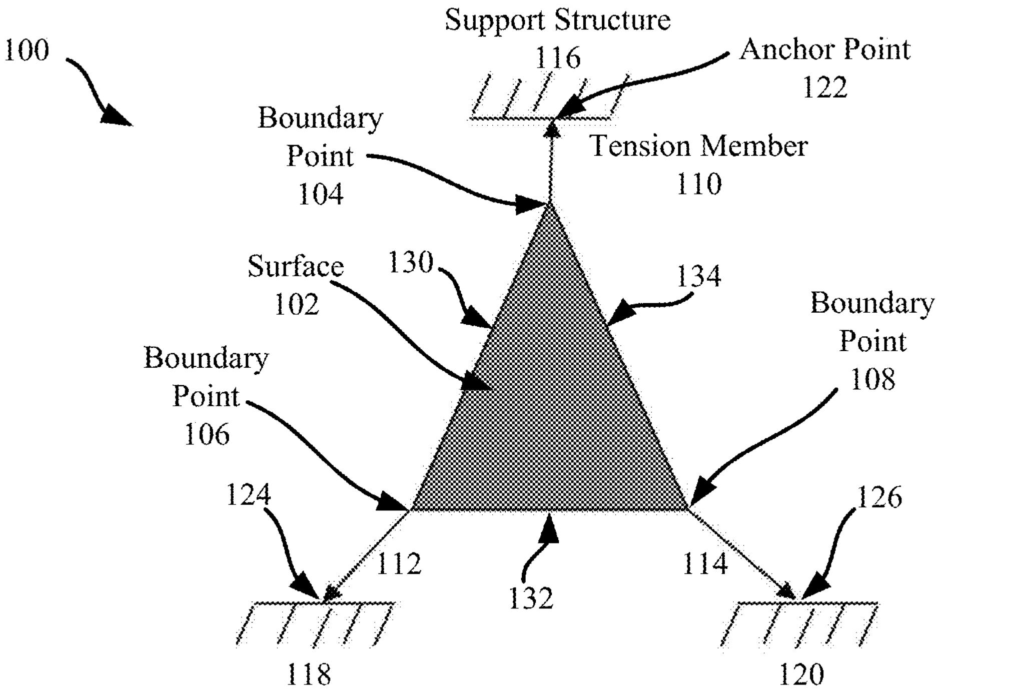
FIG. 1 (Prior Art)
FIG. 1 is an illustration that is useful for understanding a conventional tension surface assembly.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution generally concerns a novel technique for providing and maintaining an adequate tensioning load to anchor points of a surface shaping tension cord network. The novel technique can be used in various applications. The applications include, but are not limited to, antenna applications, solar concentrator applications, any other membrane surface application, or an assembly of tension members, without a membrane surface, whose geometry is controlled by the boundary attachments. The present solution will be discussed below in relation to antenna applications for ease of discussion.

In accordance with the antenna applications, the present solution provides antenna systems including precision antennas. The precision antennas are simpler in design, more reliable, and lower in cost as compared to conventional precision antennas, such as those mentioned in the Background section of this document. Unlike some conventional solutions (e.g., truss reflectors with nets or cords as surface shaping elements), the repeatability of the present antenna does not rely on the precision of a deployment mechanism and deployable support structure. The present antenna is also an edge-mounted, offset-fed reflector that can be easily modified for a wide variety of missions.

The present antenna's reflector performance is only dependent upon the accuracy of the mesh surface that is shaped by a network of tension cords (rather than the accuracy, stability and repeatability of the deployable structure as is the case for conventional precision antennas). The tension cord network of the present solution has high stiffness and maintains the correct shape so long as a preload force is maintained on boundary interfaces between the tension cord network and a perimeter hoop structure. This is achieved by providing a perimeter hoop structure with anchor points that have variable locations relative to the tension cord network while the antenna is in use and/or is in its fully extended position. The variable anchor point locations are achieved by: coupling the tension cord network to the perimeter hoop structure using a plurality of resilient members (e.g., springs); and/or providing a plurality of resilient members (e.g., springs or flexible battens) as part of the perimeter hoop structure that each extend between two respective anchor points of the plurality of anchor points. The resilient members allow a distance between each respective anchor point and a central axis of a flexible antenna reflector surface to change (e.g., increase or decrease) when the antenna is in use.

The present approach is novel because unlike previous deployable reflectors its reflector performance and accuracy do not (1) rely on precise structure-to-surface interfaces (boundary interfaces), (2) require structures with thermoselastic stability even when exposed to extreme changes in environmental conditions (e.g., temperatures while in orbit), and (3) require a deployment mechanism with precise repeatability. The present approach also provides an antenna with a minimized overall cost, minimized total number of parts and a minimized hands-on assembly time. The support structure (i.e., the collective tension cord network and perimeter structure) of the present solution is adaptable to surfaces with different shapes and sizes.

Design Theory of Present Solution

Referring now to FIG. 1, there is provided an illustration that is useful for understanding a conventional tension surface assembly 100. The assembly 100 comprises a surface 102, a surface shaping cord network 130, 132, 134, rigid support structures 116, 118, 120 and tension members (e.g., cords) 110, 112, 114. The surface can include, but is not limited to, a membrane surface. The surface 102 has a plurality of boundary points. The term "boundary point", as used herein, means a point along a continuous line forming a boundary of a closed geometric shape. In order to provide desirable tension to the surface 102 such that it maintains the proper shape during use, the surface shaping cord network 130-134 must be coupled to the rigid support structures 116-120 at each boundary point 104, 106, 108. Tension members 110, 112, 114 facilitate this coupling of the surface shaping cord network 130-134 to the support structure 116-120 at respective anchor points 122, 124, 126. The term "anchor point", as used herein, refers to a point on a support structure to which an object is anchored or coupled. The tension members 110-114 provide interfaces to the support structures with relatively high stiffness matched to the high stiffness of the surface shaping cord network 130-134. These interfaces are stable since the support structures 116-120 are rigid structures with fixed locations.

Figure 2:
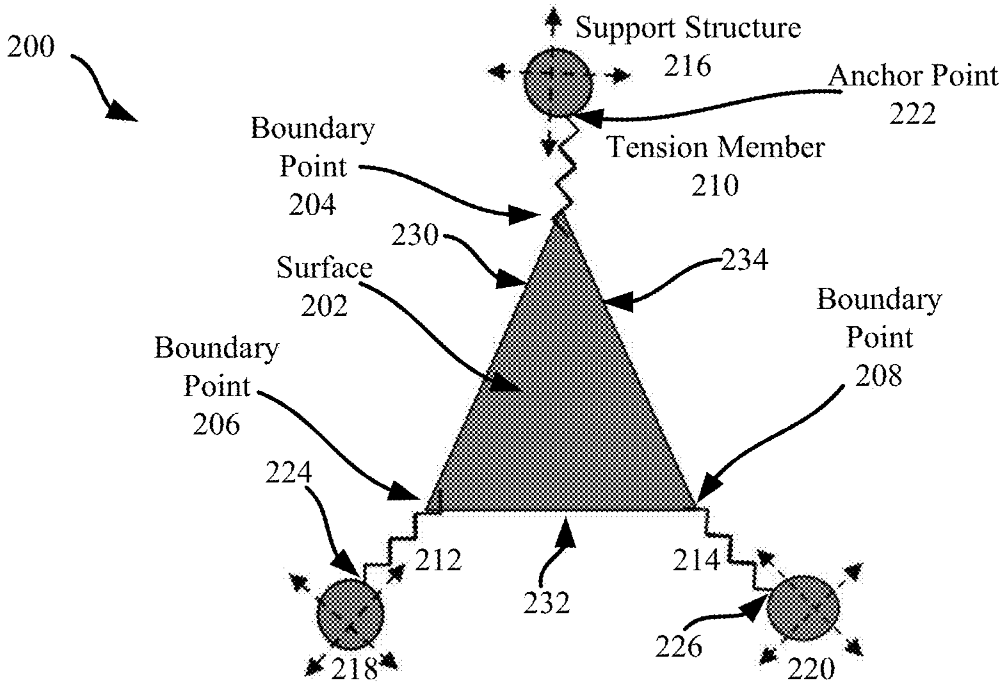
FIG. 2 is an illustration that is useful for understanding a tension surface assembly in accordance with the present solution.

Referring now to FIG. 2, there is provided an illustration that is useful for understanding a novel tension surface assembly 200 in accordance with the present solution. The assembly 200 comprises a surface 202, a surface shaping cord network 230, 232, 234, support structures 216, 218, 220 and tension members 210, 212, 214. The surface can include, but is not limited to, a membrane surface. The surface 202 has a plurality of boundary points 204, 206, 208. In order to provide desirable tension to the surface 202 such that it maintains the proper shape during use, the surface shaping cord network 230-234 must be coupled to the support structures 216-220 at each boundary point 202, 206, 208. Tension members 210, 212, 214 facilitate this coupling of the surface shaping cord network 230-234 to the support structure 216-220 at respective anchor points 222, 224, 226. The tension members 210-214 provide interfaces to the support structures with relatively low stiffness relative to the relatively high stiffness of the surface shaping cord network 230-234. In this regard, the tension members 210-214 can include, but are not limited to, resilient members (e.g., springs). The resilient members allow greater distortion of the support structures 216, 218, 220 (as compared to the distortion allowed in the conventional assembly shown in FIG. 1) without having the surface 202 and/or surface shaping cord network 230-234 experience any slack or looseness. Accordingly, the desired tension is provided to the surface 202 even when the support structures 216, 218, 220 move relative to the surface 202 as shown by the dotted line arrows. These interfaces are considered compliant interfaces since the load vectors of the tension members 210-214 remain with the same range of values, and therefore the locations of the anchor points 222-226 are within the same acceptable range of distortion at all time while in use.

Figure 3:
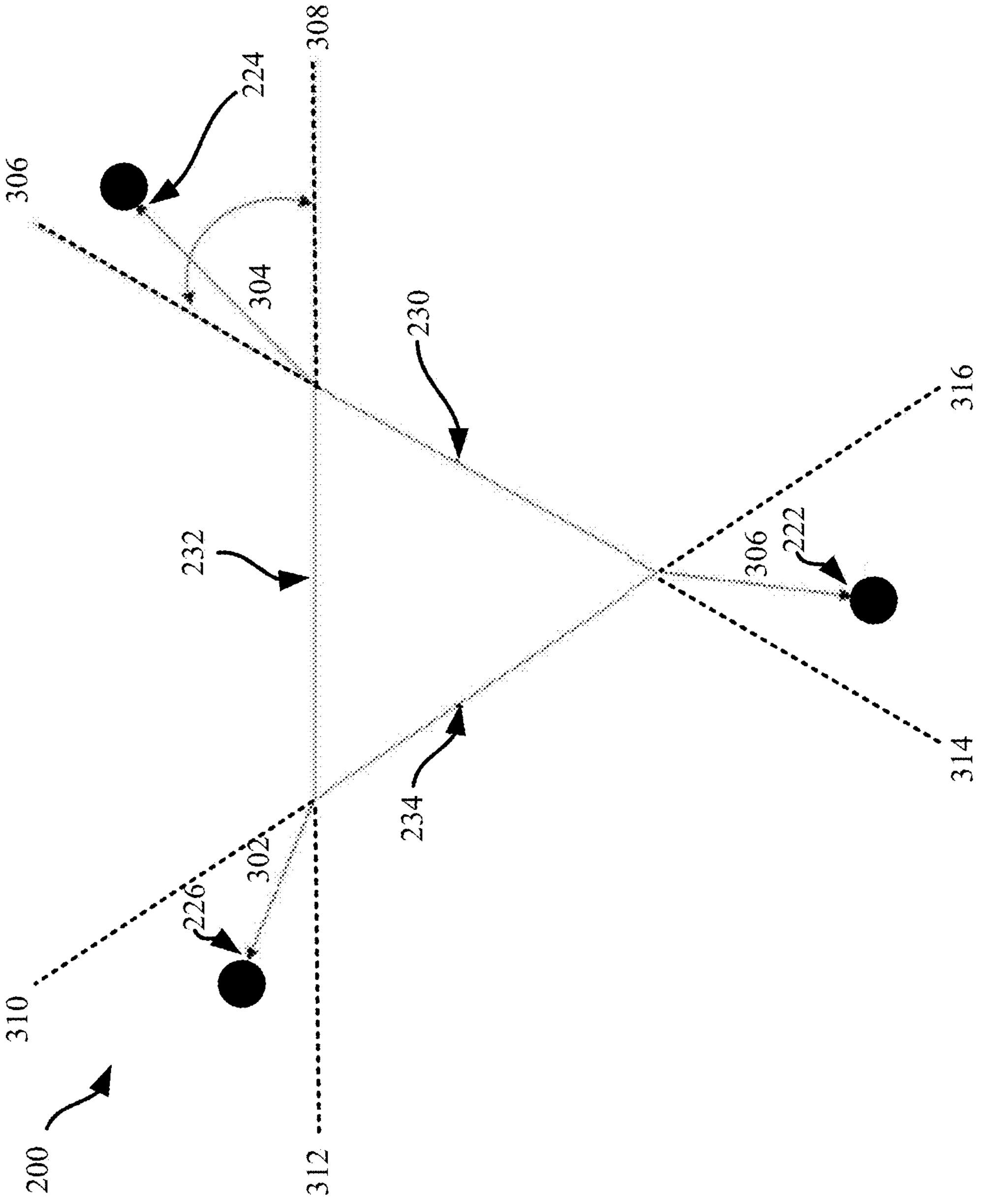
FIG. 3 is an illustration that is useful for understanding an acceptable range of distortion for anchor points of a surface shaping (or tension) cord network in accordance with the present solution.

Referring now to FIG. 3, there is provided an illustration that is useful for understanding the acceptable range of distortion for the anchor points 222-226 of a surface shaping cord network 230-234. If cords 230-234 are relatively stiff and a force 304 is in the direction of the bounded dotted lines 306 and 308, no matter where or what the force of 304 the structural surface shaping cord network 230-234 remains tensioned and will have minimum relative distortion.

If on the other hand, anchor points are precise anchor points as is the case in FIG. 1 rather than force vectors as is the case in FIG. 2, then the positions of the anchor points must be precisely located. Otherwise, displacement of the anchor point locations by a small amount results in the surface shaping cord network losing tension and going slack (distorting).

By using resilient members as the tension members 210-214, the surface shaping cord network 230-234 remains tensioned and in a precise relative location so long as the force directions 302-306 are between the extended lines 306/308, 310/312, 314/316. Thus, the directions and magnitudes of the forces 302, 304, 306 applied to the surface shaping cord network 230-234 can vary significantly when the resilient members are added to the assembly 200 without causing any loosening or slack of the surface 202. In this way, the surface and the surface shaping cord network continue to remain taut even when the anchor point locations change relative to the surface shaping cord network 230-234.

Illustrative Antennas

Extendable perimeter truss antennas are configured to transmit and receive radio waves. These antennas include an antenna feed structure (not shown) and an extendable reflector structure. The antenna feed structure is configured to convey radio waves between a transceiver and a flexible antenna reflector surface. Antenna feed structures are well known in the art, and therefore will not be described herein. However, it should be understood that the antenna feed method can include any suitable antenna feed structure. For example, the antenna feed structure may include an antenna horn, an orthomode transducer, a frequency duplexer, a waveguide, waveguide switches, a rotary joint, active patch elements and/or an electronically steerable feed. The antenna feed structure is provided on a reflective surface side of the perimeter truss antenna During transmit operations of the perimeter truss antenna, the reflector surface is illuminated by an incident Radio Frequency ("RF") signal from the antenna feed. At least a portion of the RF signal is reflected by the reflector surface to yield a desired reflected RF energy distribution. In a receive mode, incident RF energy is focused by the reflector and directed toward the antenna feed.

An illustrative extendable reflector structure 400 will now be described in relation to FIGS. 4-9. The extendable reflector structure 400 can be mounted on a support structure, such as a space borne vehicle (e.g., a spacecraft). The objective of the extendable reflector structure 400 is to: (a) maintain a deployed surface accuracy without reliance on the precision of the deployment mechanism; (b) provide a reflector with a desirably shaped aperture; (c) provide a deployed aperture with a less complex and costly mechanical deployment support structure; and (d) provide an antenna with a repeatable deployment that does not rely on the precision of the deployment mechanism.

As shown in FIGS. 4-8, the extendable reflector structure 400 has an appearance that is similar to a conventional radial perimeter truss reflector. However, the extendable reflector structure 400 is designed to allow a flexible antenna reflector surface 402 and a surface shaping (or tension) cord network 404 to continue to remain taut even when anchor point locations 406, 408 change relative to the surface shaping cord network 404. The manner in which this is achieved will become evident as the discussion progresses.

Figure 4:
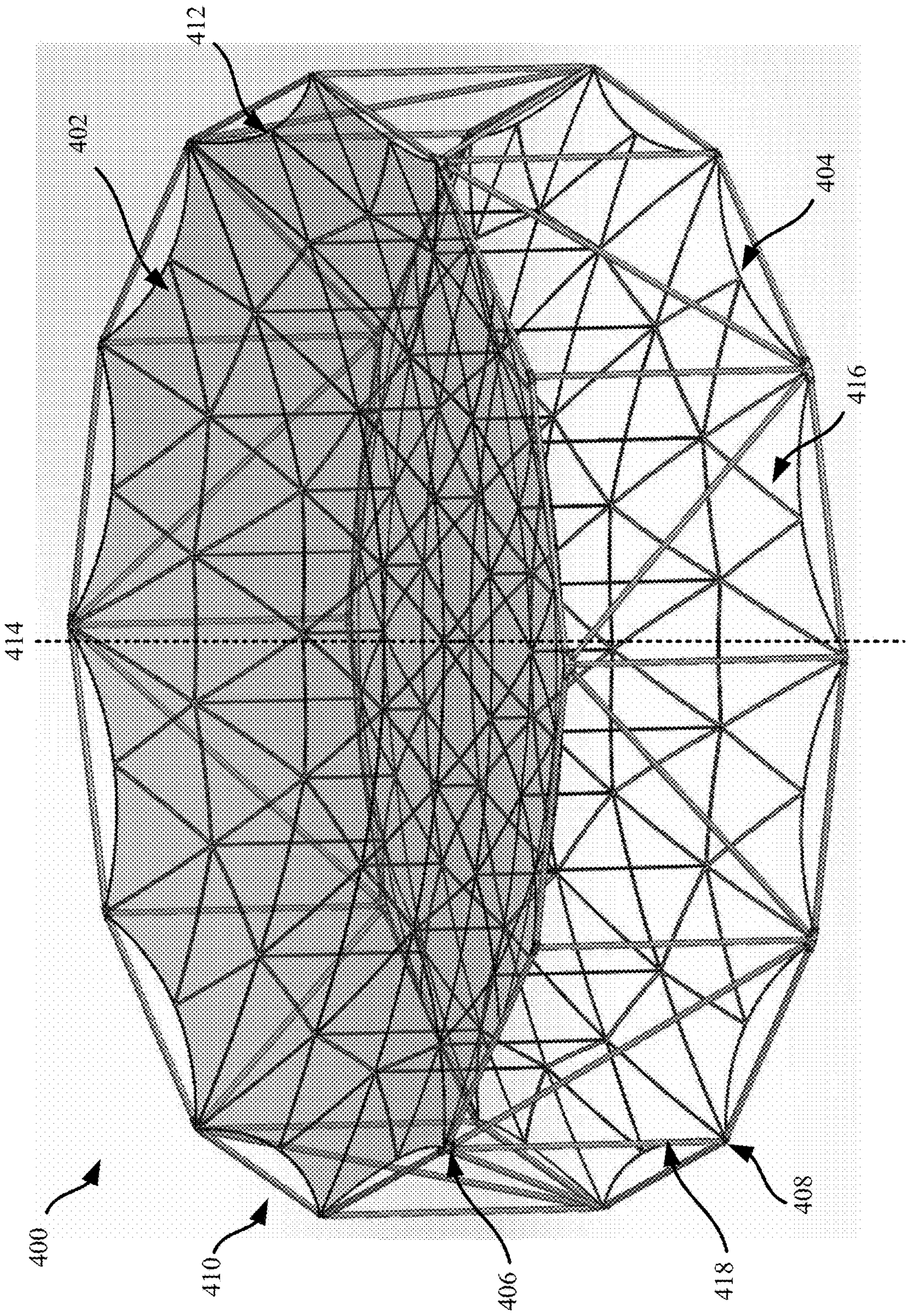
FIG. 4 is a perspective view of an extendable reflector in a fully extended position.
Figure 5:
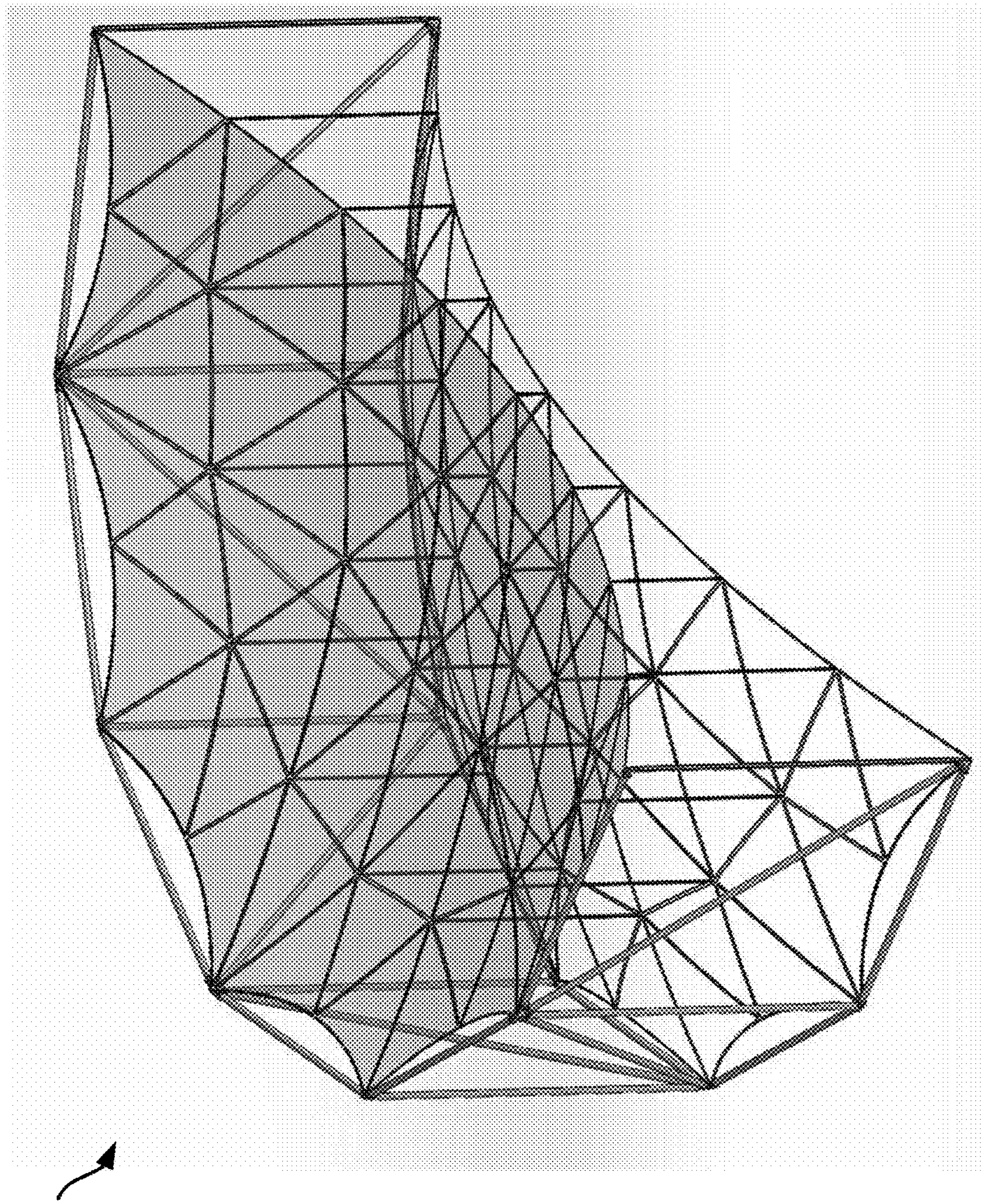
FIG. 5 is a cross-sectional view of the extendable reflector shown in FIG. 4.

In general, the extendable reflector structure 400 has a circular, parabolic shape when it is in its fully extended position as shown in FIG. 4. The extendable reflector structure 400 includes the flexible antenna reflector surface 402, the surface shaping (or tension) cord network 404, and a support structure 410. The support structure 410 is also referred to herein a perimeter hoop structure.

The reflector surface 402 is formed from any material that is suitable as an antenna's reflective surface. Such materials include, but are not limited to, reflective wire knit mesh materials similar to light weight knit fabrics. In its fully extended position shown in FIG. 4, the reflector surface 402 has a size and shape selected for directing RF energy into a desired pattern. For example, the reflector surface 402 has a scalloped cup shape with concave peripheral edge portions 412. The present solution is not limited in this regard.

The reflector surface 402 extends around a central longitudinal axis 414 of the extendable reflector structure 400. As such, the reflector surface 402 may be a curve symmetrically rotated about the central longitudinal axis 414, a paraboloid rotated around an offset and inclined axis, or a surface shaped to focus the RF signal in a non-symmetric pattern.

The reflector surface 402 is fastened to the support structure 410 via the surface shaping cord network 404. The surface shaping cord network 404 supports the reflector surface 402 creating a parabolic shape. The reflector surface 402 is dominantly shaped by the surface shaping cord network 404.

The surface shaping cord network 404 defines and maintains the shape of the reflector surface 402 when in use. In this regard, the surface shaping cord network 404 includes a plurality of interconnected cords (or thread like strings) 416. The cords 416 are positioned between the reflector surface 402 and the support structure 410 so as to provide structural stiffness to the reflector surface 402 when the perimeter truss antenna is in use.

When the extendable reflector structure 400 is in its fully deployed configuration, the surface shaping cord network 404 is a stable structure under tension. The tension is achieved by applying pulling forces to the cords by means the support structure 410.

Figure 6:
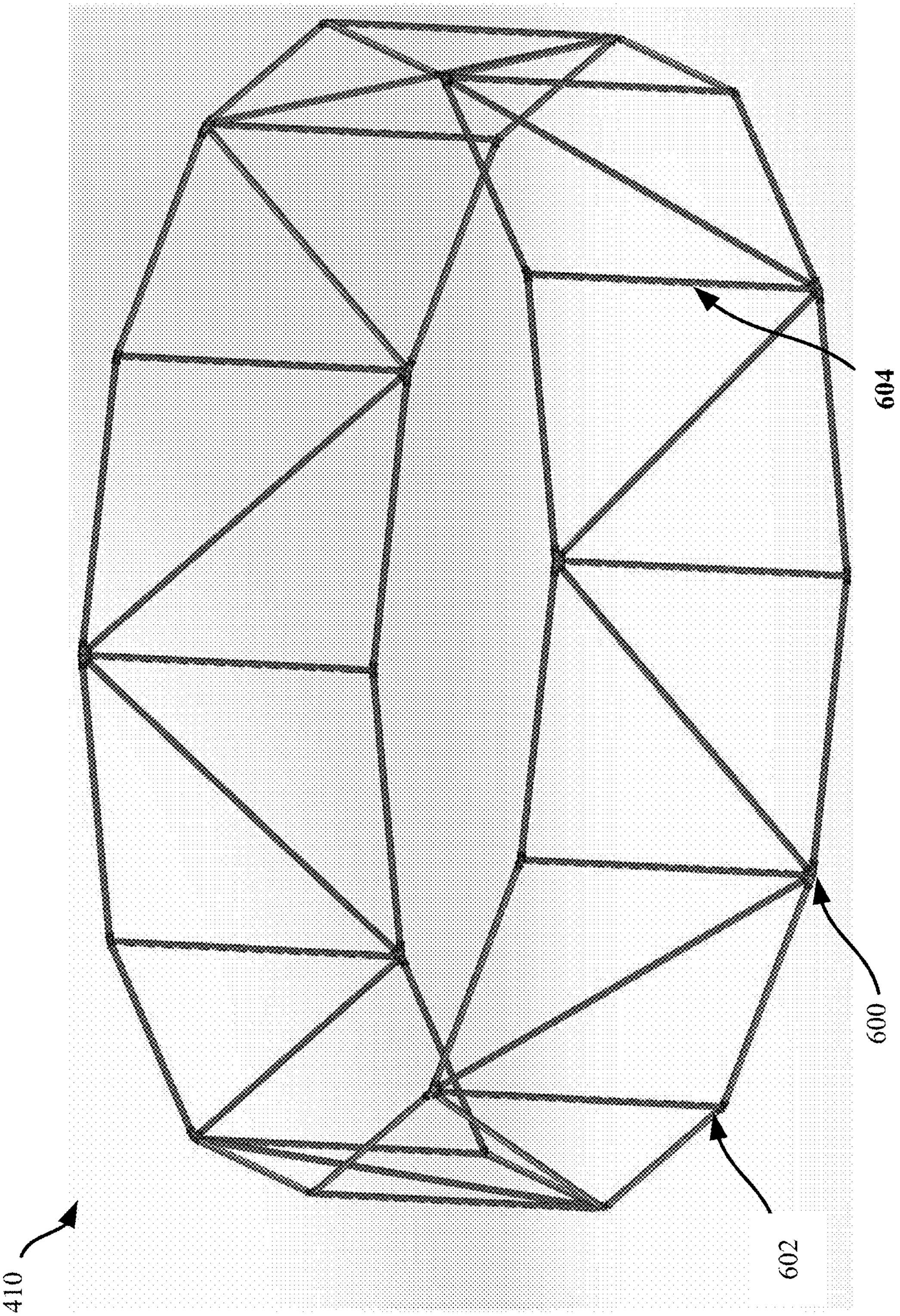
FIG. 6 is a perspective view of a perimeter hoop structure of the extendable reflector in a fully extended position.
Figure 7:
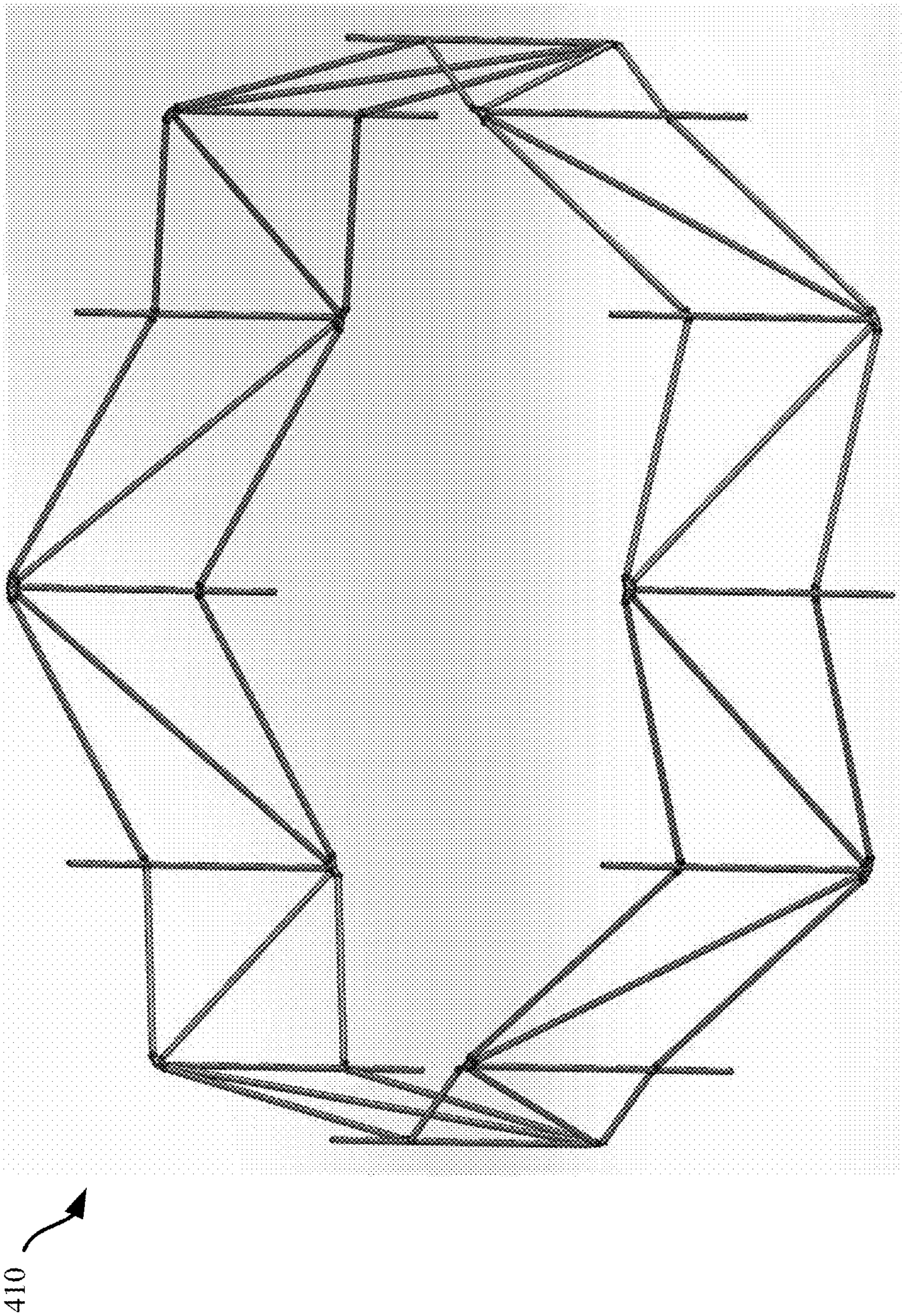
FIG. 7 is a perspective view of the perimeter hoop structure in a partially extended position.
Figure 8:
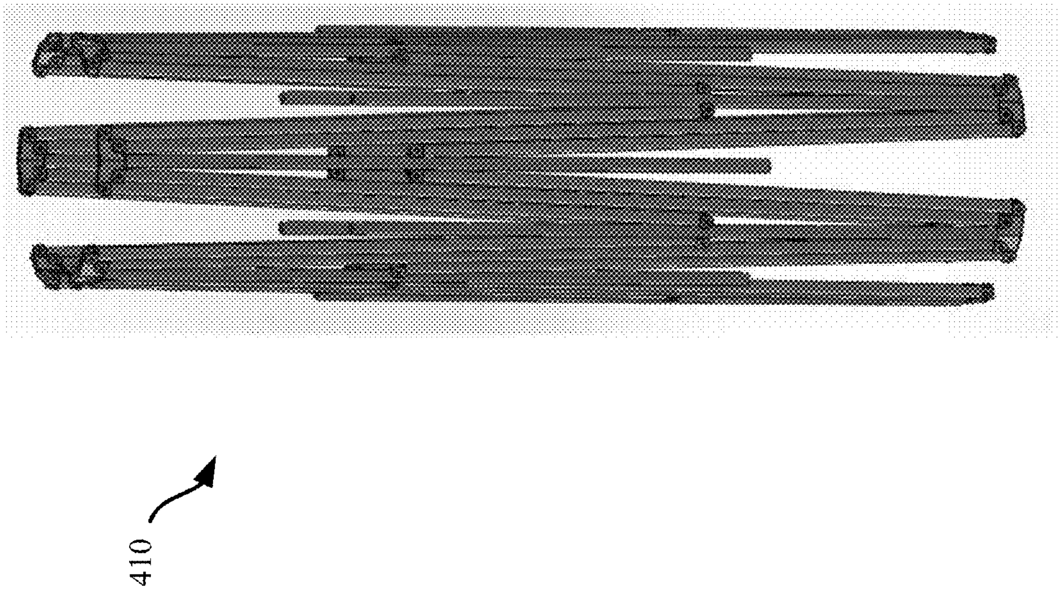
FIG. 8 is a perspective view of the perimeter hoop structure in the fully stowed position or a non-extended position.

The support structure 410 is a foldable structure that can be transitioned from a fully stored or non-extended position shown in FIG. 8 to a fully extended position shown in FIG. 6. A partially extended position of the support structure 410 is shown in FIG. 7. The support structure 410 is formed of a plurality of rigid battens 418 that are coupled to each other via joint mechanisms 600, 602. Joint mechanisms 600 simply allow battens to bend into and away from adjacent battens as shown in FIG. 7. In contrast, joint mechanisms 602 allow battens to move away from and towards adjacent battens, as well as allow horizontal battens 604 to slide therethrough as also shown in FIG. 7.

Figure 9:
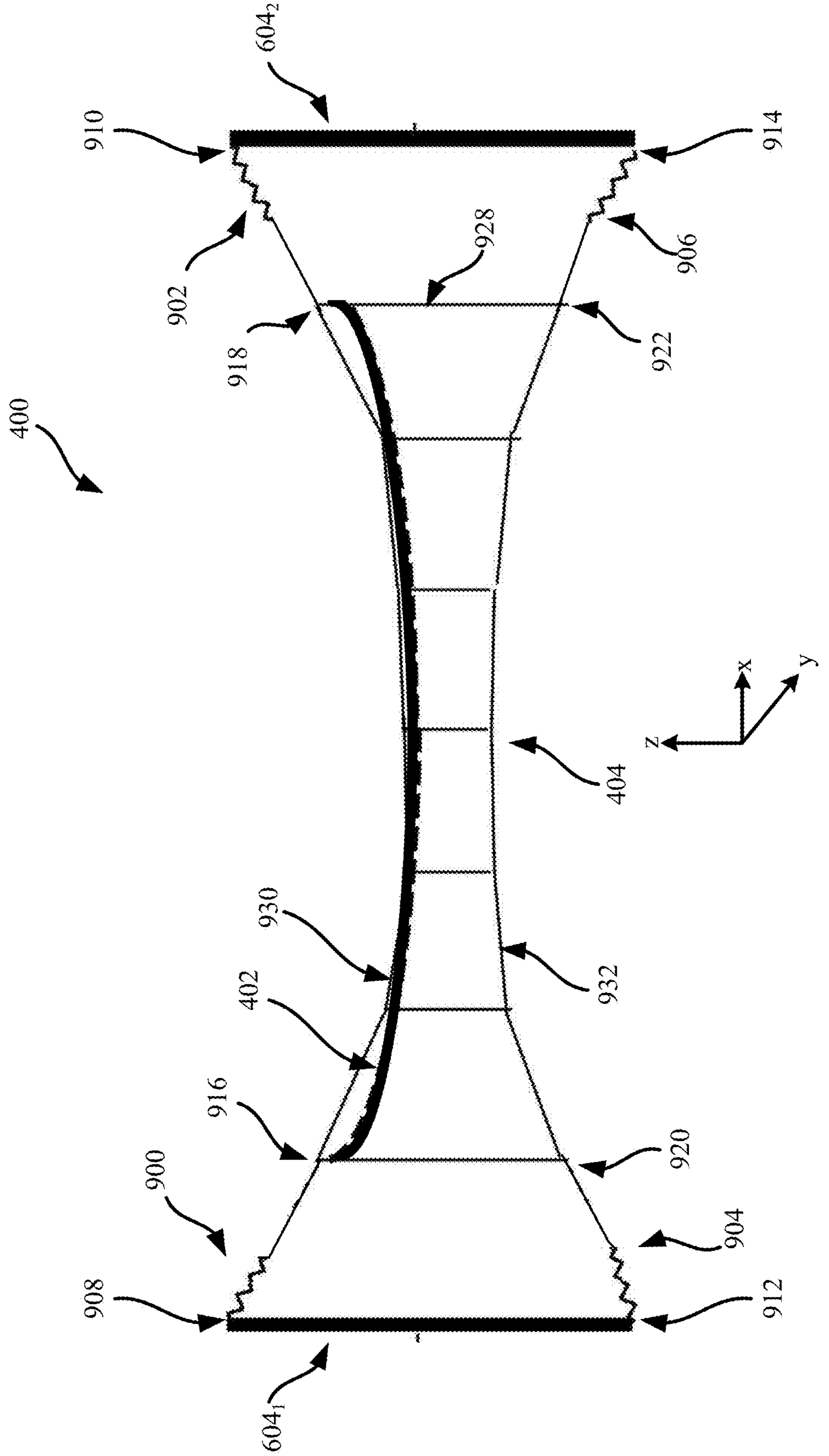
FIG. 9 is an illustration that is useful for understanding novel features of the extendable reflector that is useful for understanding a truss structure with resilient edge cords.

Referring now to FIG. 9, there is provided an illustration that is useful for understanding novel features of the extendable reflector structure 400 shown in FIGS. 4-8. Notably, the extendable reflector structure 400 comprises resilient members 900, 902, 904, 906 respectively coupled between anchor points 908, 910, 912, 914 of the battens $\mathbf{604_1}$, $\mathbf{604_2}$ and boundary points 916, 918, 920, 922 of the surface shaping cord network 404. The resilient members are selected to provide adequate tensioning loads to the boundary points of the surface shaping cord network 404. In this regard, the resilient members 900-906 include, but are not limited to, springs. In some scenarios, the springs have a spring rate of 240 pounds per inch. The present solution is not limited in this regard.

Each batten $\mathbf{604_1}$, $\mathbf{604_2}$ has two anchor points associated therewith. More specifically, batten $\mathbf{604_1}$ has anchor points 908 and 912 located at opposing ends thereof. Similarly, batten $\mathbf{604_2}$ has anchor points 910 and 914 located at opposing ends thereof. Anchor points 908, 910 are coupled to a front cord 930 of the surface shaping cord network 404, while anchor points 912 and 914 are coupled to a rear cord 932 of the surface shaping cord network 404. A plurality of fixed length tie cords 928 are provided between the front cord 930 and rear cord 932. These tie cords 928 are spaced apart along the lengths of the front and rear cords 930, 932.

Each batten $\mathbf{604_1}$, $\mathbf{604_2}$ is rigid such that when it moves in an x, y or z direction by a given amount at least one resilient member 900, 902, 904 or 906 is stretched or compressed whereby the reflector surface 402 and the surface shaping cord network 404 remain taut despite a change in the anchor point location(s) relative thereto. The tightness of the surface and surface shaping cord network is maintained since the anchor point location(s) remain within an acceptable range of distortion therefore even when changed.

Figure 10:
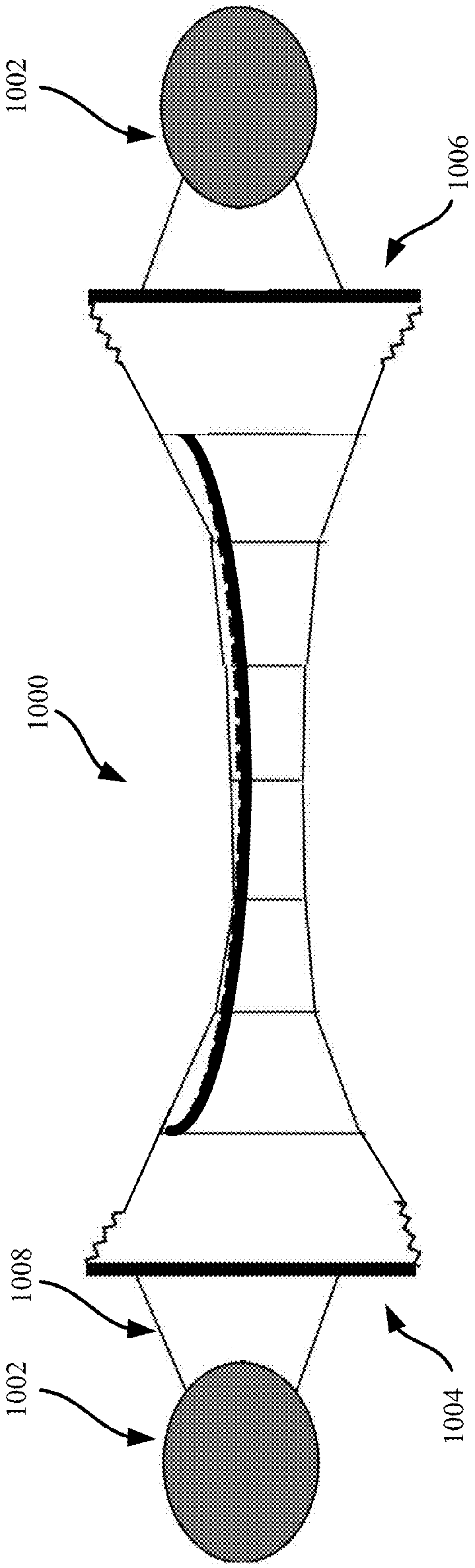
FIG. 10 is a cross sectional view of another extendable reflector that is useful for understanding a truss structure with resilient edge cords.

Referring now to FIG. 10, there is provided a cross-sectional view of another extendable reflector structure 1000. Extendable reflector structure 1000 is similar to the extendable reflector structure 400 shown in FIGS. 4-9 except for the inclusion of an inflatable hoop 1002. The inflatable hoop 1002 encompasses the extendable reflector structure 1000. In this regard, the inflatable hoop 1002 is coupled to the rigid battens 1004, 1006 via cords 1008.

Figure 11:
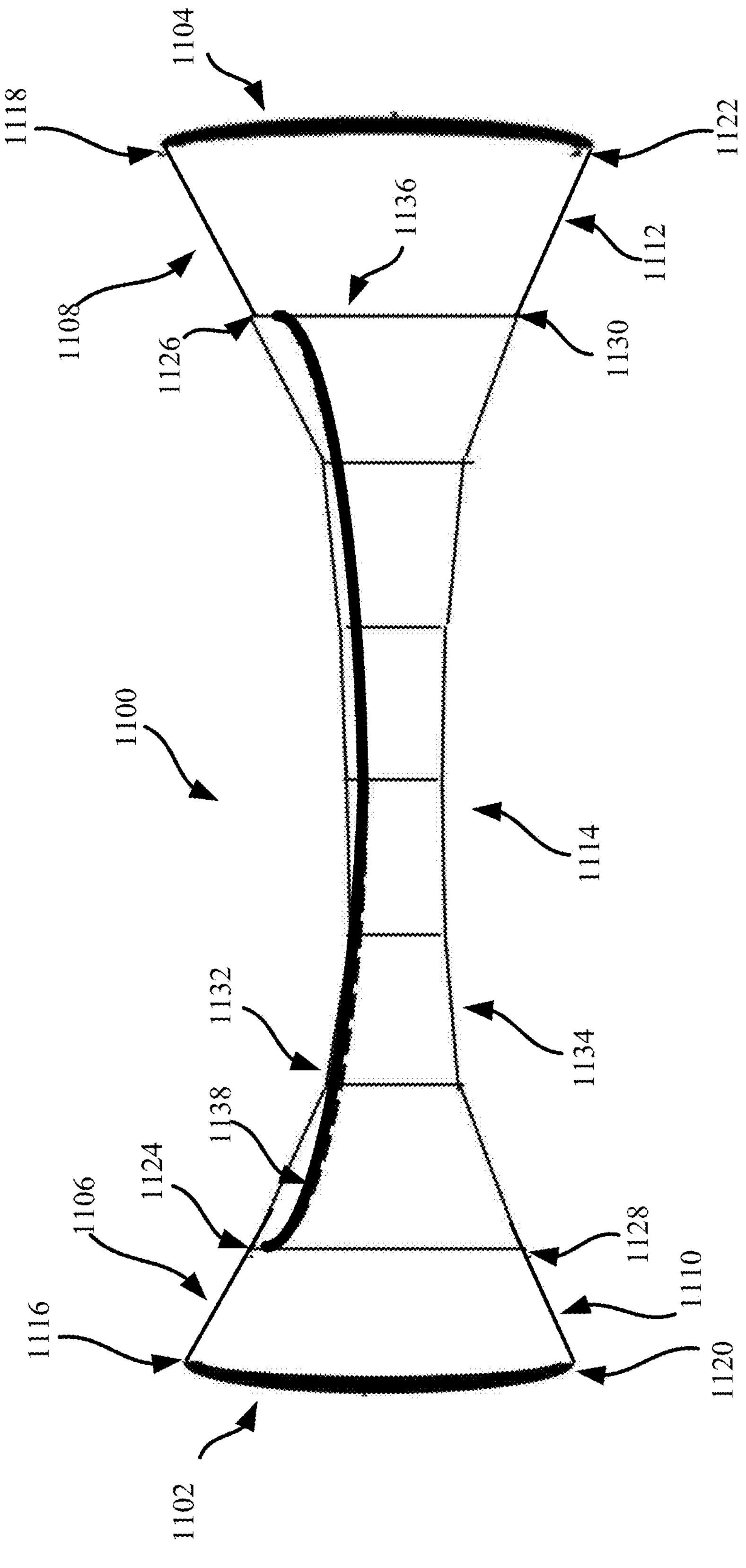
FIG. 11 is a cross sectional view of another extendable reflector that is useful for understanding a truss structure with resilient edge cords.

Referring now to FIG. 11, there is provided a cross-sectional view of another extendable reflector structure 1100. The extendable reflector structure 1100 comprises a plurality of battens 1102, 1104, cords 1106, 1108, 1110, 1112, and a surface shaping cord network 1114. The cords 1106, 1108, 1110, 1112 are respectively coupled between anchor points 1116, 1118, 1120, 1122 of the battens 1102, 1104 and boundary points 1124, 1126, 1128, 1130 of the surface shaping cord network 1114.

Each batten 1102, 1104 has two anchor points associated therewith. More specifically, batten 1102 has anchor points 1116 and 1120 located at opposing ends thereof. Similarly, batten 1104 has anchor points 1118 and 1122 located at opposing ends thereof. Anchor points 1116, 1118 are coupled to a front cord 1132 of the surface shaping cord network 1114, while anchor points 1120 and 1122 are coupled to a rear cord 1134 of the surface shaping cord network 1114. A plurality of fixed length tie cords 1136 are provided between the front cord 1132 and rear cord 1134. These tie cords 1136 are spaced apart along the lengths of the front and rear cords 1132, 1134.

Notably, the battens 1102, 1104 are flexible, and thus constitute springs. As such, the battens 1102, 1104 can bend towards and way from the surface shaping cord network 1114. The battens 1102, 1104 are designed to provide adequate tensioning loads to the boundary points of the surface shaping cord network. In effect, the surface 1138 and the surface shaping cord network 1114 remain taut despite a change in the anchor point location(s) relative thereto (as a result from batten bending. The tightness of the surface and surface shaping cord network is maintained since the anchor point location(s) remain within an acceptable range of distortion therefore even when changed.

Figure 12:
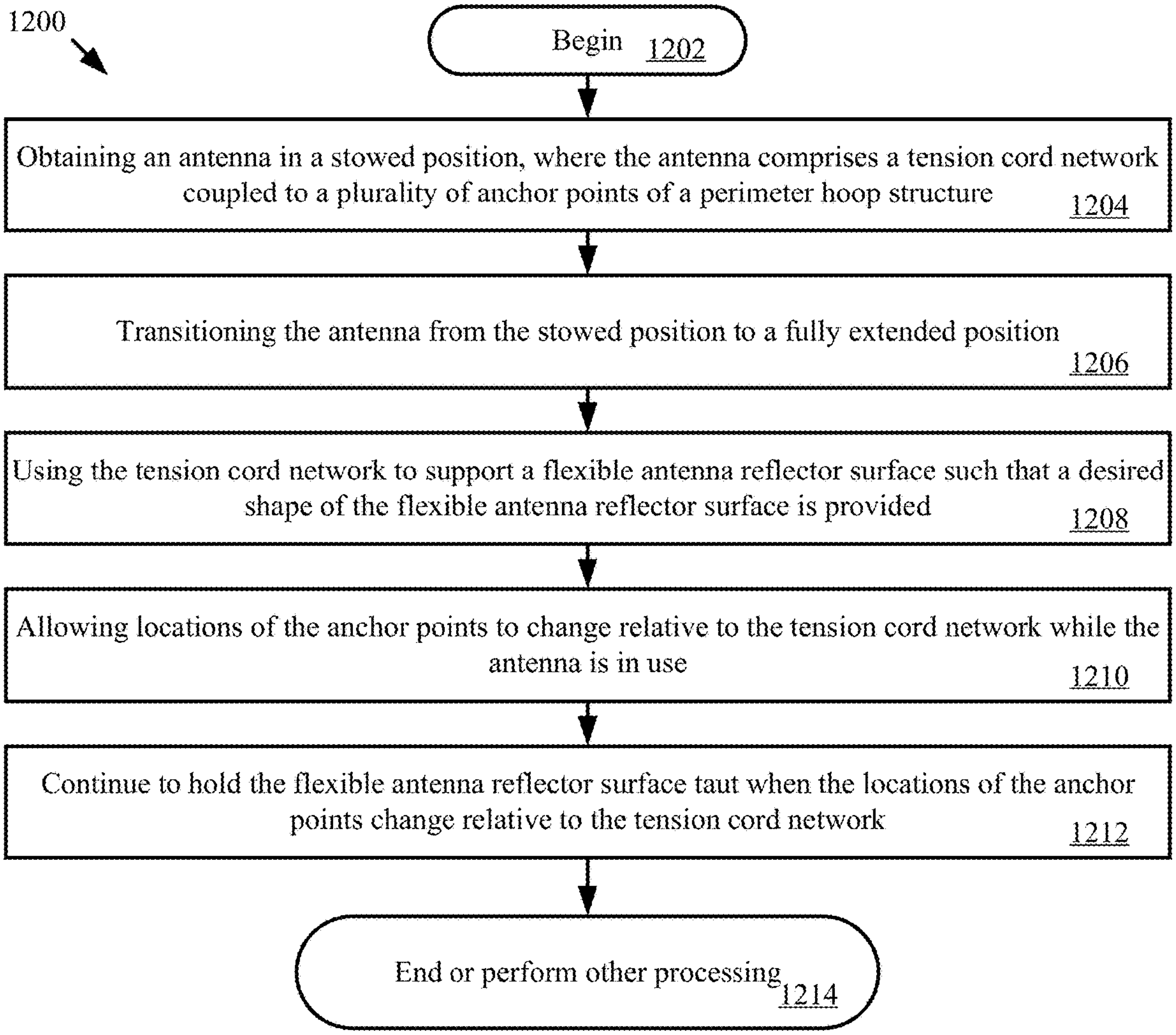
FIG. 12 is a flow diagram of an illustrative method for operating an antenna with a tension cord network coupled to a plurality of anchor points of a perimeter hoop structure.

Referring now to FIG. 12, there is provided a flow diagram of an illustrative method 1200 for operating an antenna. The method begins with 1202 and continues with 1204 where the antenna is obtained. The antenna is in its stowed position. The antenna comprises a tension cord network (e.g., surface shaping cord network 404 of FIG. 4-9) coupled to a plurality of anchor points (e.g., anchor points 908, 910, 912, 914 of FIG. 9) of a perimeter hoop structure (e.g., support structure 410 of FIGS. 4-9). In some scenarios, the tension cord network is coupled to the perimeter hoop structure by a plurality of resilient members (e.g., springs) (e.g., resilient members 900, 902, 904, 906 of FIG. 9). The perimeter hoop structure comprises a ring, a plurality of stiff battens (e.g., battens 604 of FIGS. 4-9), or a plurality of spreader bars that each extend between two respective anchor points of the plurality of anchor points. In other scenarios, the perimeter hoop structure comprises a plurality of resilient members that each extend between two respective anchor points of the plurality of anchor points. Each resilient member of the plurality of resilient members comprises a spring or a flexible batten (e.g., battens 1102, 1104 of FIG. 11).

In next 1206, the antenna is transitioned from the stowed position to a fully extended position. The tension cord network is used to support a flexible antenna reflector surface (e.g., reflector surface 402 of FIGS. 4-9) such that a desired shape of the same is provided, as shown by 1208. In 1210, locations of the anchor points are allowed to change relative to the tension cord network while the antenna is in use. Accordingly, a distance between at least one of the anchor points and a central axis of the flexible antenna reflector surface may change (e.g., increase or decrease) when the antenna is in use.

As shown by 1212, the flexible antenna reflector surface continues to be held taut when the locations of the anchor points change relative to the tension cord network. Subsequently, 1214 is performed where method 1200 ends or other processing is performed.

The present solution applies to any structure where a deployable precision surface (a) is used to reflect or concentrate RF energy or light (such as a wire mesh, a membrane or a splined radial panel), and (b) is shaped/controlled by use of a network of tensioned cords and ties in configurations such as concentric cord catenaries or front/rear triangular facet nets. Compliant spring interfaces link the tensioned cord network to a deployable supporting structure. Spring properties are selected so that sufficient tension for surface accuracy is maintained throughout the tensioned cord network despite larger manufacturing and environmental distortion of the deployable support structure than is tolerable within the surface. An illustrative solution is a perimeter truss reflector with triangular faceted front and rear nets (e.g., with an RF reflective mesh membrane restrained in concave near parabolic shape by the front net). Each net's outer perimeter is fastened to battens that are in turn connected to the deployable structure through compliant springs. Thus, the deployable structure is partially isolated from the precision surface shaping elements. Accordingly, the present solution's dependence on structural deployment precision is reduced. The battens of the perimeter truss reflector may be deployed by any structure that expands from a stowed position and provides a radial outward force to the battens (including inflatable toroid, various types of truss hoop structures, pantographs, articulated hoop structures, etc.).

As evident from the above discussion, the present solution provides a novel design approach to decouple and desensitize the accuracy of precision tensioned cord networks (that shape reflector surfaces) from the accuracy of structures and mechanisms used to deploy the assembly. Previous design practice has always relied on the high precision of the deployment mechanism and deployable support structure. The key to the present solution is the selection of resilient member (e.g., spring) stiffness and allowable vector (load and direction) of the resilient member's force that will maintain acceptable preload and dimensional accuracy in the surface shaping cord network and tie network.

Compliance in deployed space structures is generally unfavorable because of reduced vibration frequencies. However, the membrane surface is very low mass and will not significantly couple with the vibration of the host spacecraft. The surface shaping network resilient member interface makes the deployable structure an interchangeable subassembly compatible with a wider range of configurations to deploy reflector surfaces.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating an antenna with a surface shaping cord network coupled to a plurality of anchor points of a perimeter hoop structure, comprising:

using the surface shaping cord network to support a flexible antenna reflector surface such that a given shape of the flexible antenna reflector surface is provided;

using the surface shaping cord network and a plurality of first resilient members to couple the flexible antenna reflector surface to the perimeter hoop structure, wherein two resilient members of the plurality of first resilient members are respectively coupled to anchor points located at two opposing ends of a respective batten of a plurality of battens; and using the plurality of first resilient members to further allow locations of the anchor points to change relative to the surface shaping cord network while the antenna is in use;

wherein the flexible antenna reflector surface is held taut when the locations of the anchor points change relative to the surface shaping cord network.

2. The method according to claim 1, wherein at least one cord of the surface shaping cord network extends along a front or rear side of the flexible antenna reflector surface in a horizontal direction, and the first resilient members resiliently couple two opposing ends of the at least one cord of the surface shaping cord network to respective ones of the plurality of anchor points which are spaced apart from each other in the horizontal direction.

3. The method according to claim 2, wherein the at least one cord comprises a plurality of smaller cords coupled to each other.

4. The method according to claim 2, wherein the perimeter hoop structure comprises a ring, a plurality of stiff battens, or a plurality of spreader bars that each extend between two respective anchor points of the plurality of anchor points.

5. A method for operating an antenna with a surface shaping cord network coupled to a plurality of anchor points of a perimeter hoop structure, comprising:

using the surface shaping cord network to support a flexible antenna reflector surface such that a given shape of the flexible antenna reflector surface is provided;

using the surface shaping cord network to couple the flexible antenna reflector surface to flexible battens of the perimeter hoop structure, wherein each said flexible batten extends between two respective anchor points of the plurality of anchor points which are spaced apart in a vertical direction;

allowing the flexible battens to bend towards and away from the surface shaping cord network to facilitate changes to locations of the anchor points relative to the surface shaping cord network while the antenna is in use; and using the flexible battens to keep the locations of the anchor points within a specified range from a reference point;

wherein tautness of the flexible antenna reflector surface is maintained when the locations of the anchor points change relative to the surface shaping cord network.

6. The method according to claim 5, wherein each flexible batten is configured to act as a spring.

7. The method according to claim 1, wherein a distance between at least one of the anchor points and a central axis of the flexible antenna reflector surface changes when the antenna is in use.

8. The method according to claim 7, wherein the distance is decreased.

9. The method according to claim 7, wherein the distance is increased.

10. An antenna, comprising:

a flexible antenna reflector surface;

a tension cord network configured to support the flexible antenna reflector surface and maintain a shape of the flexible antenna reflector surface when in use;

a perimeter hoop structure comprising a plurality of battens and a plurality of anchor points to which the tension cord network is coupled; and a plurality of first resilient members configured to couple the flexible antenna reflector surface to the perimeter hoop structure via the tension cord network, and configured to allow the location of each anchor point of the plurality of anchor points to change relative to the tension cord network while the antenna is in the fully extended position;

wherein the flexible antenna reflector surface is held taut when the location of each anchor point changes relative to the tension cord network; and wherein two resilient members of the plurality of first resilient members are respectively coupled to ones of the anchor points which are located at two opposing ends of a respective batten of a plurality of battens.

11. The antenna according to claim 10, wherein at least one cord of the tension cord network extends along a front or rear side of the flexible antenna reflector surface in a horizontal direction, and the first resilient members resiliently couple two opposing ends of the at least one cord of the tension cord network to respective ones of the plurality of anchor points which are spaced apart from each other in the horizontal direction.

12. The antenna according to claim 11, wherein the plurality of first resilient members comprises springs.

13. The antenna according to claim 11, wherein the perimeter hoop structure comprises a ring, a plurality of stiff battens, or a plurality of spreader bars that each extend between two respective anchor points of the plurality of anchor points.

14. An antenna, comprising:

a flexible antenna reflector surface;

a tension cord network configured to support the flexible antenna reflector surface and maintain a shape of the flexible antenna reflector surface when in use;

a perimeter hoop structure comprising a plurality of anchor points to which the tension cord network is coupled; and a plurality of flexible battens coupled to the flexible antenna reflector surface via the tension cord network, wherein each said flexible batten (i) extends between two respective anchor points of the plurality of anchor points which are spaced apart in a vertical direction, (ii) is configured to bend towards and away from the tension cord network to facilitate changes to locations of respective anchor points of the plurality of anchor points relative to the tension cord network while the antenna is in the fully extended position, and (iii) is configured to keep the locations of the respective anchor points within a specified range from a reference point;

wherein the flexible antenna reflector surface is held taut when the locations of the anchor points change relative to the tension cord.

15. The antenna according to claim 14, wherein each flexible batten is configured to act as a spring.

16. The antenna according to claim 10, wherein a distance between at least one of the anchor points and a central axis of the flexible antenna reflector surface changes when the antenna is in use.

17. The antenna according to claim 16, wherein the distance is decreased.

18. The antenna according to claim 16, wherein the distance is increased.

* * * * *